United States Patent [19]
Righter et al.

[11] Patent Number: 5,881,793
[45] Date of Patent: Mar. 16, 1999

[54] SHADE ASSEMBLY MOUNT FOR VEHICLE COMPARTMENT

[75] Inventors: David E. Righter, Troy; Edward G. Curtindale, Farmington Hills, both of Mich.

[73] Assignee: UT Automotive Dearborn, Inc., Dearborn, Mich.

[21] Appl. No.: 677,815

[22] Filed: Jul. 10, 1996

[51] Int. Cl.[6] .................................................... A47G 5/02
[52] U.S. Cl. .................... 160/323.1; 160/903; 296/37.16
[58] Field of Search ............................ 160/323.1, 370.22, 160/23.1, 903, 324, 325, 326; 248/266; 296/37.16, 98

[56] References Cited

U.S. PATENT DOCUMENTS

| | | |
|---|---|---|
| 3,279,529 | 10/1966 | Smith et al. . |
| 3,853,170 | 12/1974 | Barettella . |
| 4,139,231 | 2/1979 | Lang et al. . |
| 4,168,094 | 9/1979 | Yagi ...................................... 296/37.16 |
| 4,222,601 | 9/1980 | White et al. .......................... 296/37.16 |
| 4,480,675 | 11/1984 | Beremeier . |
| 4,668,001 | 5/1987 | Okumura et al. ..................... 296/37.16 |
| 4,671,557 | 6/1987 | Lemp ................................ 160/323.1 X |
| 4,781,234 | 11/1988 | Okumura et al. . |
| 5,083,601 | 1/1992 | Tedeschi ............................... 160/323.1 |
| 5,224,748 | 7/1993 | Decker et al. . |
| 5,618,077 | 4/1997 | Ament et al. ......................... 296/37.16 |
| 5,676,415 | 10/1997 | Ament et al. ......................... 160/323.1 |

FOREIGN PATENT DOCUMENTS

| | | |
|---|---|---|
| 0258823 | 8/1987 | European Pat. Off. . |
| 0668187 | 11/1994 | European Pat. Off. . |
| 9004662 | 8/1990 | Germany . |
| 4405281 | 9/1995 | Germany . |
| 29516099 | 1/1996 | Germany . |

*Primary Examiner*—David M. Purol
*Attorney, Agent, or Firm*—Howard & Howard

[57] ABSTRACT

Several shade assembly embodiments are disclosed which allow the shade assembly to be mounted in a vehicle interior while accommodating varying interior widths. In one embodiment, spring-biased latches engage a depression in an outer lateral surface of the roller assembly. In a related embodiment, a release button is included on the roller assembly. In an alternative embodiment, a U-shaped spring is biased axially outwardly of the roller assembly to engage a mounting surface on an opposed wall of the vehicle interior. In another embodiment, an end member comprises attachment structure having a lower member biased radially away from a longitudinal axis of an upper member. A bracket receives the end member and has an opening that is smaller than the expanded distance of the end member when the lower member is biased away from the upper member. The upper and lower members can be biased together such that the end member may be moved into the bracket. The upper and lower members are then released, and the end member secures itself within the bracket. In a final embodiment, a housing surrounds the roller assembly and has a hook which is to be moved into an opening in a rear panel of the vehicle. The assembly is thus not subjected to problems caused by variations of width in the vehicle interior since the roller member is mounted on a hook that will be secured to a wall opposed to the surface where the cover will be attached. The cover is pulled outwardly away from the hook, and thus the cover itself will accommodate any variation in distance.

5 Claims, 5 Drawing Sheets

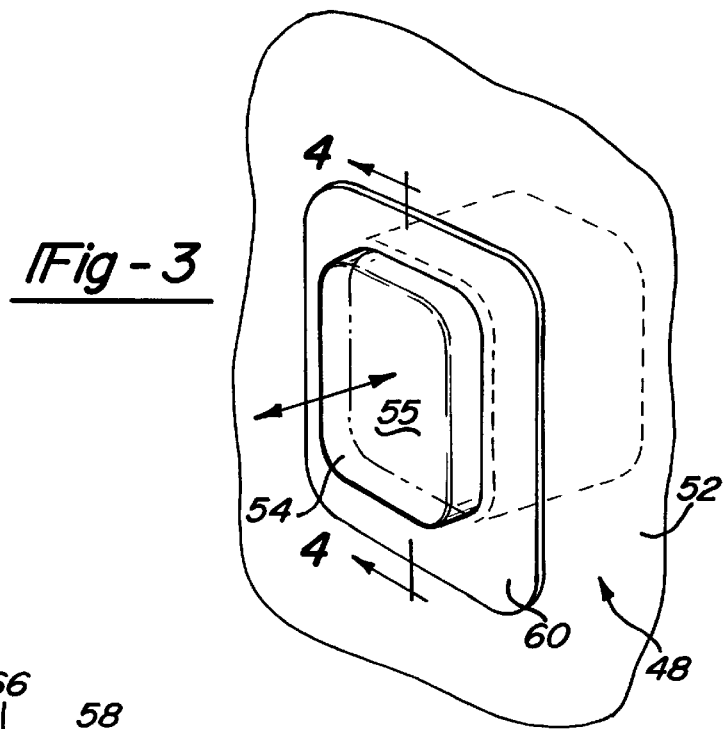
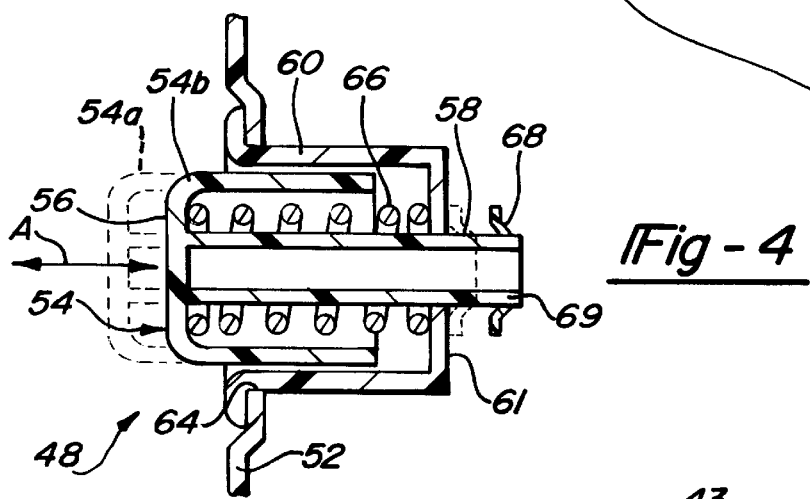
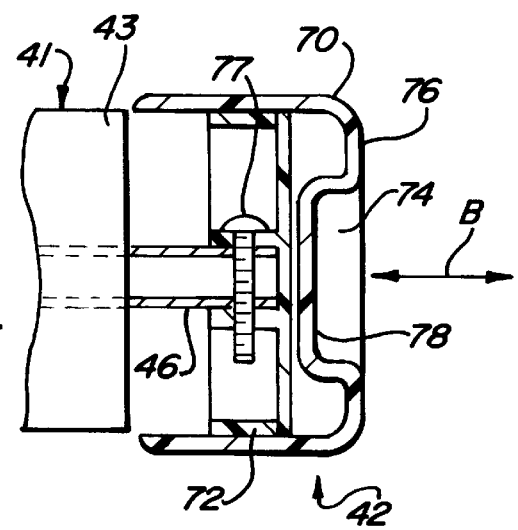

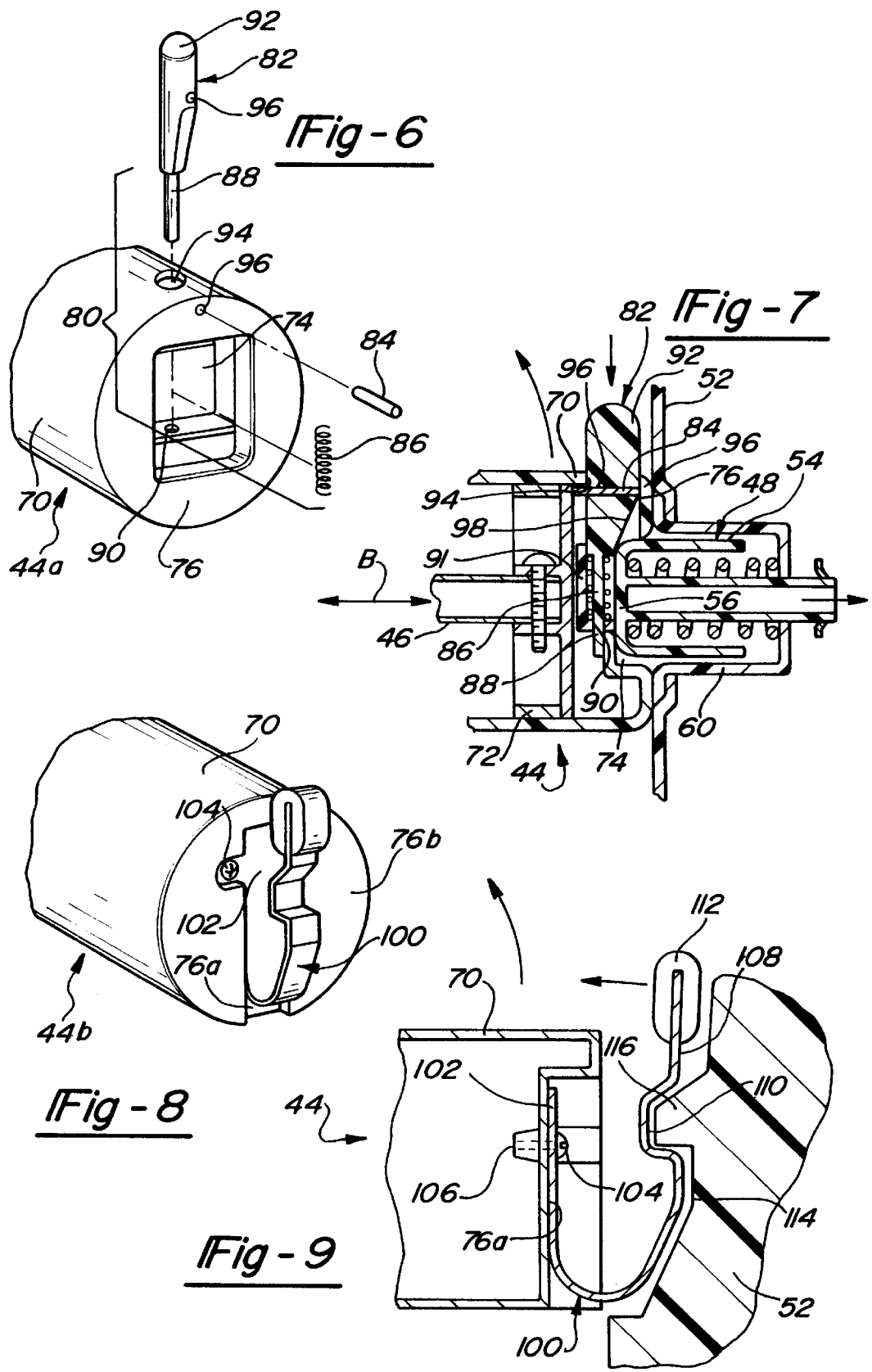

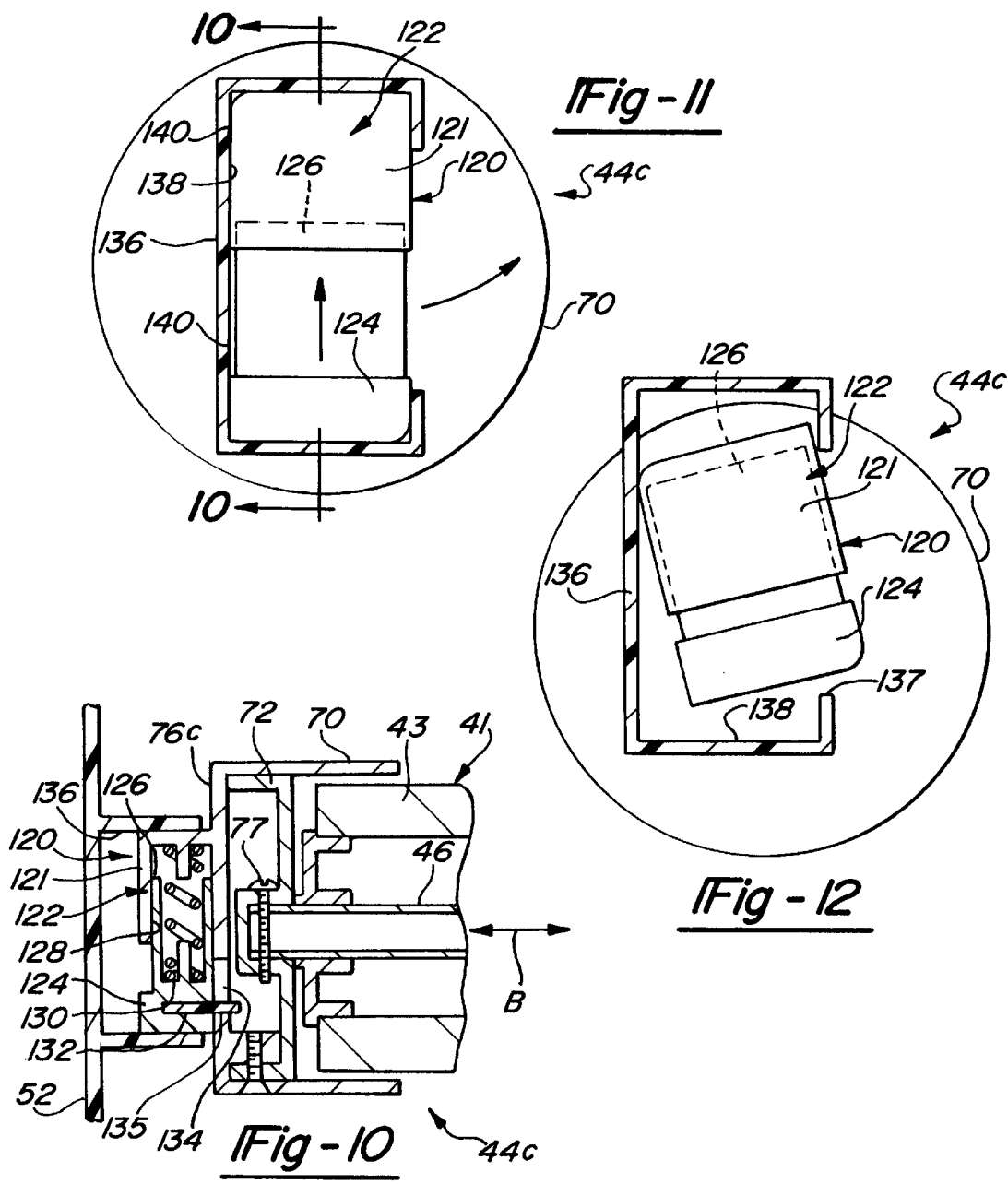

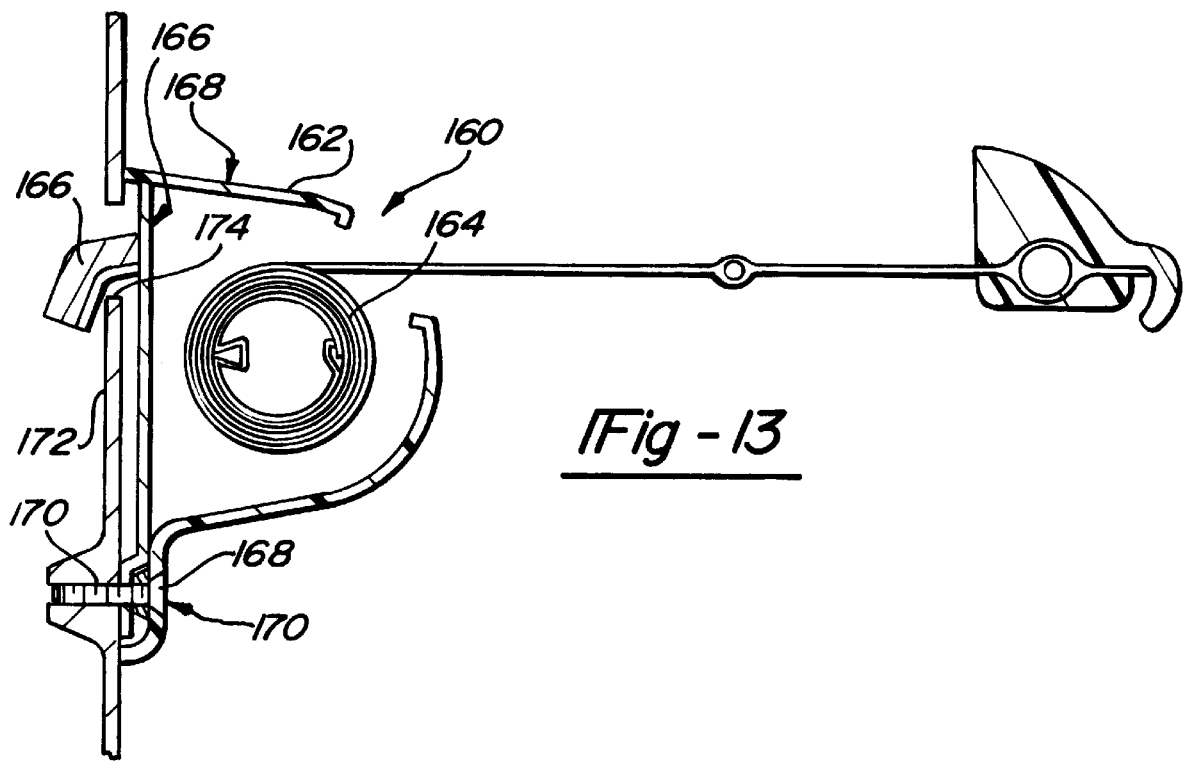

SHADE ASSEMBLY MOUNT FOR VEHICLE COMPARTMENT

BACKGROUND OF THE INVENTION

The present invention relates to mounting structure for shade assemblies to cover a vehicle luggage compartment.

Shade assemblies have covers that extend by unwinding from a roller to cover valuables located in the vehicle compartment. The cover may also be retracted by winding the cover onto the roller.

Known shade assemblies have been mounted by securing ends of the roller or shade assembly to fixed mounting brackets on interior walls of the vehicle. One problem with known shade assemblies is that the width of the vehicle interior varies due to production variations from vehicle to vehicle. Thus, the lateral distance between the fixed mounting brackets also varies. The known art has made attempts at trying to address this problem.

In one prior example, spring-biased members are disposed at opposed ends of the roller in a shade assembly. The end members are urged into contact with a recess in a fixed mounting bracket.

In another prior example, a shade assembly includes fixed end members disposed at opposed ends of the shade assembly. The end members are inserted into a mounting hole of a fixed mounting bracket. A small plate is disposed in the mounting hole and a spring biases the plate toward the end members.

The spring biased mounting of the known shade assemblies have not been completely satisfactory.

SUMMARY OF THE INVENTION

The inventive shade assemblies include a flexible cover, a roller and rotational biasing structure to wind the cover onto the roller. First and second mounting members engage corresponding first and second brackets mounted on vehicle trim panels. Several embodiments of the mounting members are disclosed.

In one embodiment, the mounting members comprise a spring that biases a latch outwardly of an interior vehicle wall. The roller assembly has depressions in laterally outer end cap faces. The latches engage the end cap depression surfaces to support the corresponding ends of the roller assembly. The latch and depression are preferably disposed along a common axis to provide additional rotational stability. The spring biased latches are forced back toward the vehicle interior by the roller to accommodate varying vehicle interior widths. In another similar embodiment, a release structure is provided to move the latch back inwardly and assist removal of the shade assembly.

In an alternative embodiment, a generally U-shaped spring is fixed at a first outer face of the roller assembly. The spring has a notch biased axially outwardly to engage a mounting surface in an opposed wall of the vehicle interior. The spring accommodates variation in the size of the vehicle interior.

Another embodiment has attachment structure with a lower member biased radially away from a longitudinal axis of the roller assembly. The attachment structure is received in a generally C-shaped bracket secured to opposed walls of the vehicle interior. The bracket is deeper than the attachment structure, such that the attachment structure can extend to several depths within the bracket and then lock itself within the bracket. In this way, variation in vehicle interior size is accommodated.

In a further embodiment, the roller assembly is surrounded by a housing. The housing is hooked to a latch opening formed adjacent a seat rear surface. Since the roller assembly is not attached to the side panels, variation in width is not an issue.

These and other features of the present invention will be best understood from the following specification and drawings, of which the following is a brief description.

BRIEF DESCRIPTION OF THE DRAWINGS

FIG. 3 is a perspective view of a spring-biased mounting member of the shade assembly of FIG. 2.

FIG. 4 is a cross-sectional view of the mounting member of FIG. 3 along view lines 4—4.

FIG. 5 is a cross-sectional view of an end member of a shade assembly in accordance with the present invention.

FIG. 6 is an exploded perspective view of an alternate embodiment shade assembly in accordance with the present invention.

FIG. 7 is a cross-sectional view of the end member of FIG. 6.

FIG. 8 is a perspective view of another alternative embodiment shade assembly in accordance with the present invention.

FIG. 9 is a cross-sectional view of the end member of FIG. 8 in an engaged position.

FIG. 10 is a partial cross-sectional side view of another alternative embodiment of shade assembly in accordance with the present invention.

FIG. 11 is a cross-sectional end view of the shade assembly of FIG. 10.

FIG. 12 is a cross-sectional end view of the shade assembly of FIG. 11 during disengagement from a mounting bracket.

FIG. 13 shows yet another embodiment shade assembly.

DETAILED DESCRIPTION OF A PREFERRED EMBODIMENT OF THE INVENTION

Figure 1:
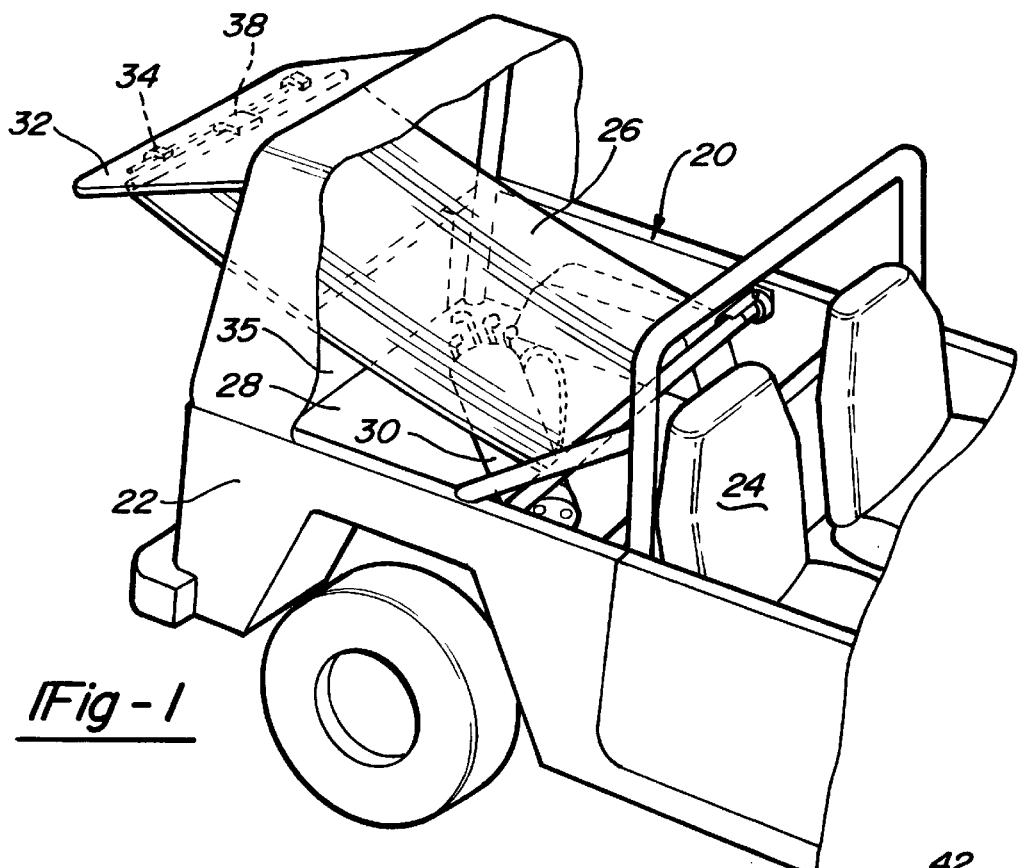
FIG. 1 is a perspective view of a vehicle having a shade assembly with the cover in an extended position.

A shade assembly 20 is shown mounted in vehicle 22 in FIG. 1 behind rear seat 24. Shade assembly 20 includes a flexible cover 26 which extends across a luggage compartment 28 to shield items 30 from view. Cover 26 may be attached to a hatch or rear door 32 in any known manner, such as hook 34. Cover 26 may alternatively be attached to rear wall 35. Although a front to back cover is shown, the cover may also extend from side to side. Cover free end 36 may also include a handle 38 to facilitate the extension and retraction of cover 26.

Figure 2:
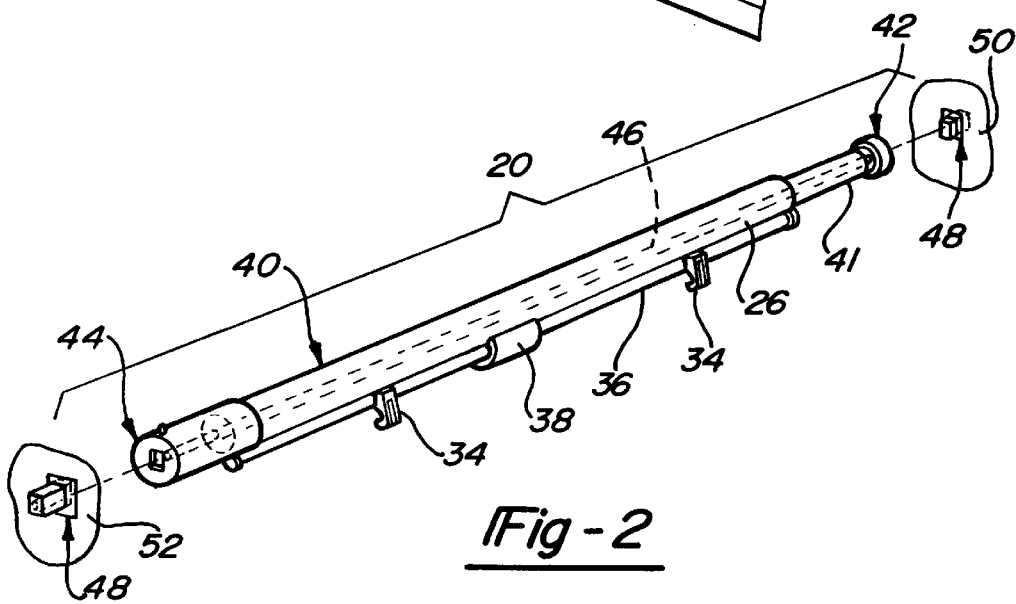
FIG. 2 is a perspective view of one embodiment of the shade assembly in accordance with the present invention.

As shown in FIG. 2, roller assembly 40 includes end members 42 and 44 at opposed ends of a rod 46. Roller 41 is rotationally mounted and supported on rod 46 and is able to rotate on rod 46 to extend or retract cover 26 in a known manner. Shade assembly 20 also includes a pair of mounting members 48 which extend from opposed walls 50 and 52 of the vehicle interior 28. Mounting members 48 are mounted opposed to each other. Each mounting member 48 is biased toward vehicle interior 28 and engage end members 42, 44 of roller assembly 40 as described below.

FIG. 3 shows a mounting member 48 including a latch 54 biased toward vehicle interior 28 from interior wall 52.

Latch 54 is shown having a generally rectangular cross-section; however, latch 54 may have any cross-sectional configuration. The only limitation to the shape of latch 54 is its ability to properly engage end member 42 or 44 and support roller assembly 40 as described below.

As shown in FIG. 4, latch 54 has a head portion 56 and a central shaft portion 58. Latch 54 is shown disposed in a housing 60, which is secured in a hole 64 in wall 52. A spring 66 is disposed circumferentially around central shaft portion 58 of latch 54. Spring 66 biases latch 54 into vehicle interior 28. A retainer 68 disposed at a free end 69 of central shaft portion 58 prevents latch 54 from moving completely out of housing 60. Thus, latch 54 moves freely along a horizontal axis A between a compressed position such as shown at 54b, and a fully extended position 54a shown in phantom.

FIG. 5 shows an end member 42 disposed at one end of roller assembly 40. End member 42 is preferably similar to opposed end member 44 of roller 41. End member 42 includes end cap 70 and a spacer 72. End cap 70 has a depression 74 defined by surface 78, which is preferably centrally disposed about a longitudinal axis B of roller assembly 40. End cap 70 surrounds, and is fixed to, spacer 72. End member 42 may be secured to rod 46 in any known manner, such as screw 77.

Latch 54 preferably matches the shape of depression 74. The roller assembly is mounted in vehicle interior 28 by positioning one end cap 70 into mating engagement with latch 54 and pushing outwardly. Latch 54 will move from extended position 54a toward compressed position 54b. The other end of the roller assembly is then moved to be aligned with its latch 54. The roller assembly is released and the two latches center and secure the roller assembly due to the spring bias. The spring bias also accommodates production width variation.

FIG. 6 shows an alternative end member 44a disposed on at least one end of roller assembly 40, here end member 44a, includes a latch release assembly 80 described below. FIG. 7 shows end member 44a engaged by latch 54. Roller assembly 40 is securely mounted in vehicle interior 28, and also engaged by the opposed mounting member 48. In a vehicle having a wider interior width, the latches 54 in the opposed mounting member 48 extend further from opposed walls 50 and 52 to fully engage end members 42 and 44a as described above. In narrower vehicle interior widths, latches 54 will extend into vehicle interior 28 to a lesser extent, but still fully engage end members 42 and 44a. Preferably, axes A and B are coaxially aligned.

Latch release assembly 80 includes latch release button 82, a retaining pin 84 and a spring 86. Spring 86 surrounds a lower portion 88 of button 82. Lower portion 88 extends into radial hole 90 in a spring holding member 91. An upper portion 92 of button 82 is supported in an upper radial hole 94 in cap 70. Pin 84 is mounted in axial hole 96 and extends rearwardly beyond button 82. Spring 86 biases button 82 radially away from the longitudinal axis B of roller assembly 40, and pin 84 prevents button 82 from moving through hole 94.

Button 82 is depressed (in a downward direction in FIG. 7) and head portion 56 of latch 54 slides along sloped surface 98 of button 82, and into housing 60. When button 82 is fully depressed, latch 54 is moved out of recess 74. End member 44a of roller assembly 40 may then be lifted upwardly and moved out of engagement with mounting member 48. The other end of roller assembly 40 may then be simply removed.

An alternative embodiment end member 44b is shown in FIG. 8. End member 44b includes a generally U-shaped spring 100, with a first end portion 102 fixed to outer face 76b of end cap 70 at indented portion 76a. A similar spring may be used at the opposed end 42.

As shown in FIG. 9, at least one screw 104 passes through end portion 102 into an axial hole 106 in end cap 70. An outer end portion 108 of spring 100 including notch 110, and a release button 112 which is biased away from lateral face 76.

Interior wall 52 of vehicle 22 includes a fixed mounting surface 114 that generally follows the contour of outer end portion 108. A projecting shoulder 116 fits into notch 110 of spring 100 to retain end member 44 in engagement with interior wall 52. Spring 100 adjusts the amount of outward movement to accommodate tolerances in vehicle interior widths.

To disengage roller assembly 40 from mounting surface 114, release button 112 is moved axially inward toward the interior 28 of vehicle 22 from interior vehicle wall 52. Notch 110 disengages from shoulder 116, and roller assembly 40 may then be lifted upwardly. Note that the release button 112 is at a position spaced radially outwardly from the radially outermost extent of the end cap 70. Thus, in the mounted position shown in FIG. 9, release button 112 is still readily accessible.

FIG. 10 shows another alternative embodiment end member 44c, including alternative attachment structure 120 extending from lateral face 76c of end cap 70. Attachment structure 120 includes an upper member 122 fixed to cap 70 and lower member 124 movable relative to upper member 122 and cap 70. Upper member 122 has a wall 121 spaced from lateral face 76c. Lower member 124 has a pair of spaced legs 126 movable in a channel 128 defined between wall 121 and lateral face 76. A spring 130 biases lower member 124 radially outwardly from the longitudinal axis B of roller assembly 40. A retaining pin 132 extends axially from lower member 124 along a slot 134 in end cap 70 to retain legs 126 in channel 128. The interior walls 52 of vehicle 22 include generally C-shaped mounting brackets 136. Mounting brackets 136 extend from the interior wall for a depth that is greater than the depth of the attachment structure 120.

As shown in FIG. 11, the inner surface 138 of mounting bracket 136 generally corresponds to the outer periphery 140 of attachment structure 120. In the mounted position shown in FIG. 11, the outer periphery 140 of attachment structure 120, i.e., the outer peripheries of upper member 122 and lower member 124, abuts the inner surface 138 of bracket 136 securing the roller assembly. Spring 130 holds the members 122 and 124 in this position.

Because bracket 136 extends for a depth greater than the depth of the attachment structure 120, the shade assembly is able to accommodate various vehicle interior widths. In vehicles having narrower interior widths, attachment structure 120 extends further into brackets 136 along longitudinal axis B. In vehicles having a wider vehicle interior width, attachment structure 120 may extend into bracket 136 to a lesser extent. Under either circumstance, spring 130 biases lower member 124 and upper member 122 into bracket 136. As a result, roller assembly 40 is securely, yet releasably mounted in a vehicle 22.

To disengage (or engage) attachment structure 120 from bracket 136, the roller may be moved toward the lower member 124. Spring 130 is compressed and the upper end of upper member 122 may be pivoted outwardly (or inwardly) of an opening 137 in bracket 136.

FIG. 13 shows yet another embodiment wherein the distance variation between the side walls is eliminated as a factor. In the embodiment 160 as shown in FIG. 13, a housing 162 surrounds the roller assembly 164. Hooks 166 are formed on the rear of the housing 162. A screw 168 extends through an opening 170 in a rear trim panel 172. Hook openings 174 are formed in trim panel 172. Hook 166 and screw 168 are mounted on opposed sides of the axis of rotation to better secure the assembly. Variation in width is not a concern since the housing is not attached between two side panels.

A preferred description of this invention has been disclosed; however, a worker of ordinary skill in the art would recognize that certain modifications would come within the scope of this invention. For that reason, the following claims should be studied in order to determine the true scope and content of this invention.

We claim:

1. A shade assembly for a vehicle compartment comprising:

a roller assembly including a flexible cover wound onto a roller and rotatable about an axis;

an end member disposed at one end of said roller assembly and adapted to be secured to a first wall of a vehicle interior, said end member including a first member fixed to said end member, and a second member biased by a spring radially outwardly from said axis, and relative to said first member, said first and second members being spaced apart from each other by a first distance in a relaxed position of said spring;

a bracket to be secured on a wall of a vehicle interior, said bracket having an opening of a size less than said first distance, and a space inwardly of said opening, such that said end member is movable through said opening and into said space and said first and second members move to said relaxed position in said space, said end member cannot move outwardly of said opening, and said first and second members being movable perpendicular to said axis against the force of said spring such that said first and second members together define a size of said end member less than the size of said opening to allow said roller to be removed from, or inserted into, said bracket.

2. A shade assembly as recited in claim 1, wherein said bracket is generally C-shaped, and an opening of said C-shaped defining said opening for receiving said end member.

3. A shade assembly as defined in claim 2, wherein said roller assembly extends along an axis, said end member extends along said axis into a depth of said C-shaped bracket for a varying amount to adjust for varying distances between the opposed vehicle walls which will support said roller assembly.

4. A shade assembly as recited in claim 1, wherein said first member including a channel, and said second member being moveable radially within said channel.

5. A shade assembly as recited in claim 4, wherein said spring for biasing said second member away from said first member is received in said channel.

* * * * *